Jan. 24, 1956 A. STEINER 2,731,988
TOOL HOLDING AND RECIPROCATING APPARATUS
Filed May 29, 1952 3 Sheets-Sheet 1
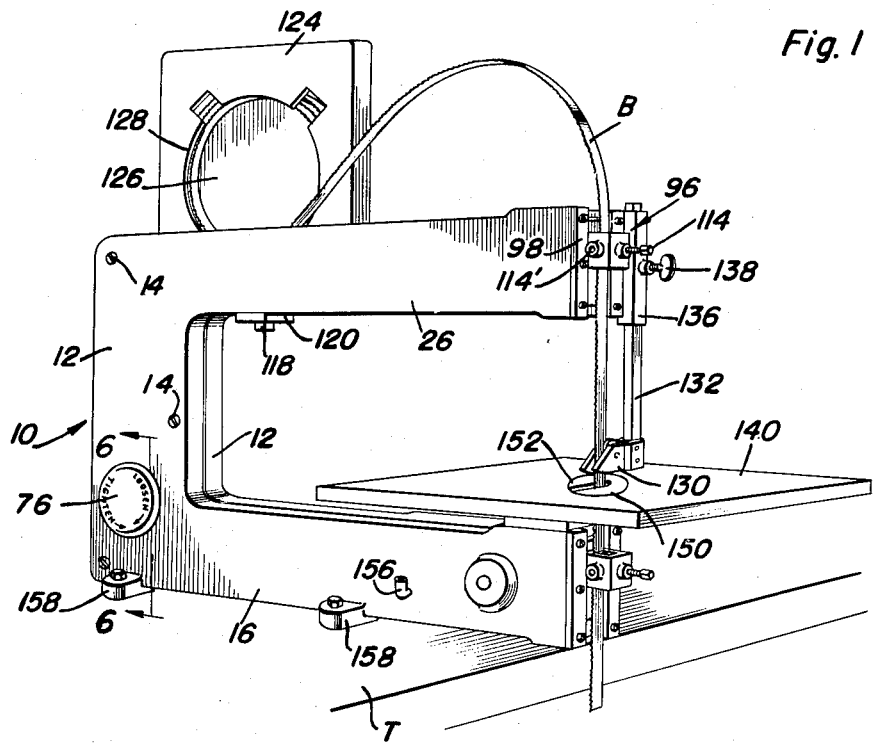
Fig. 1
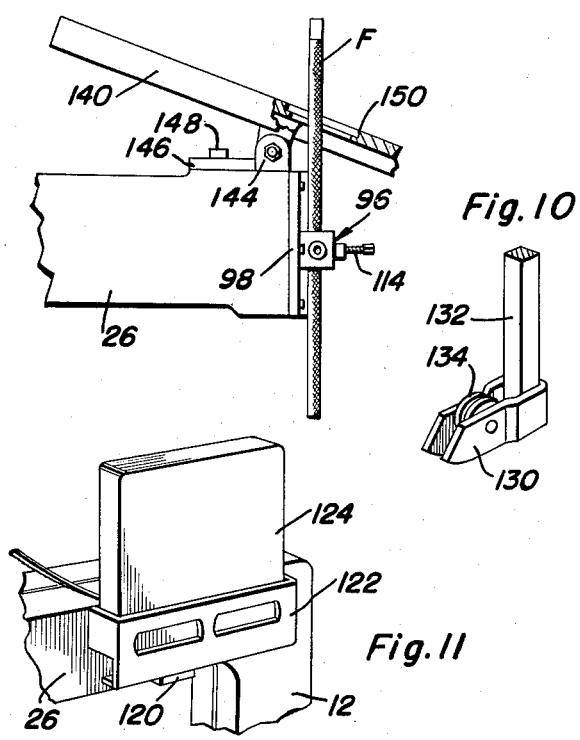
Fig. 9
Fig. 10
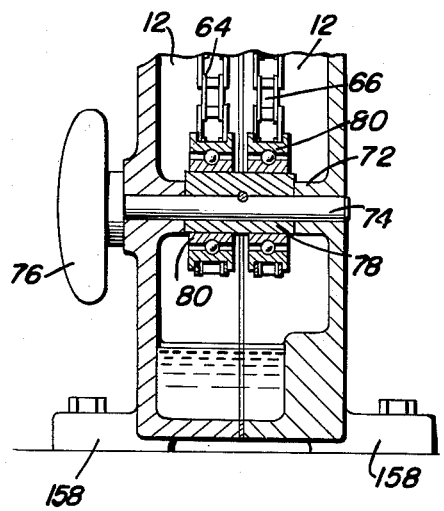
Fig. 6
Fig. 11
Alois Steiner
INVENTOR.
BY
Attorneys Jan. 24, 1956  A. STEINER  2,731,988
TOOL HOLDING AND RECIPROCATING APPARATUS
Filed May 29, 1952  3 Sheets-Sheet 2

Alois Steiner
INVENTOR.

BY
Attorneys

Jan. 24, 1956  A. STEINER  2,731,988
TOOL HOLDING AND RECIPROCATING APPARATUS
Filed May 29, 1952  3 Sheets-Sheet 3
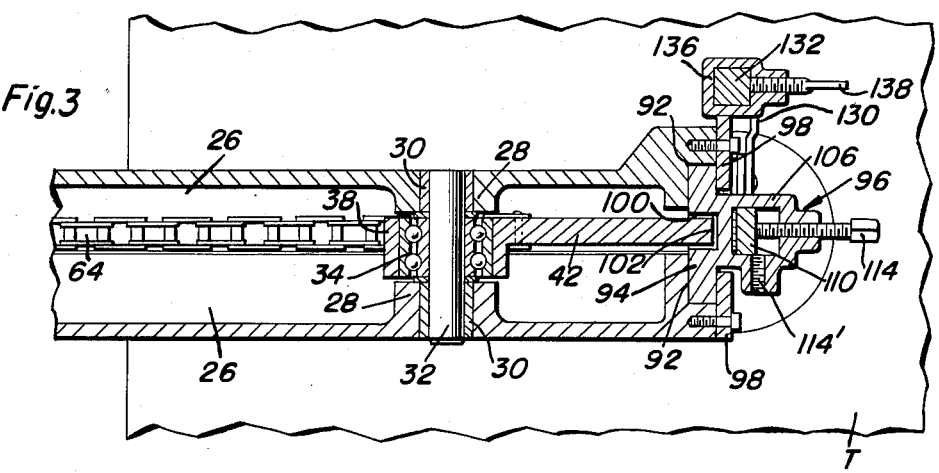
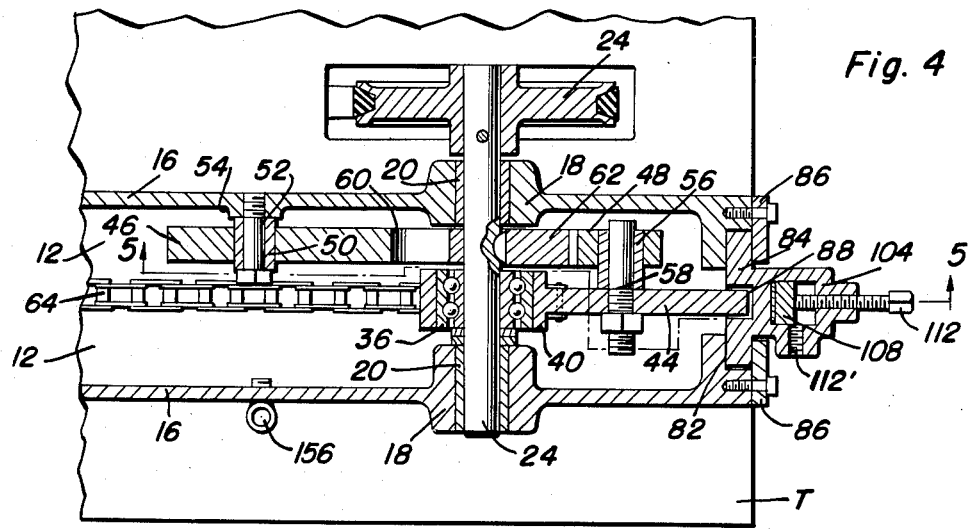
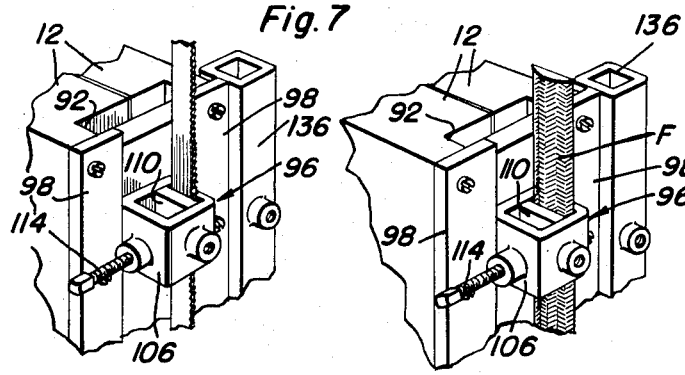
Alois Steiner
INVENTOR.

United States Patent Office 2,731,988
Patented Jan. 24, 1956

2,731,988

TOOL HOLDING AND RECIPROCATING APPARATUS

Alois Steiner, Hoboken, N. J.

Application May 29, 1952, Serial No. 290,632

5 Claims. (Cl. 143—70)

This invention relates to new and useful improvements in tool holders and the primary object of the present invention is to provide a machine for holding and reciprocating various type tools, such as band saw blades, files and the like.

Another important object of the present invention is to provide tool holding and reciprocating apparatus involving upper and lower vertically slidable clamps and novel and improved means operatively connecting the clamps for unitary sliding movement thereof, whereby the same may clampingly engage a blade or a file.

Yet another object of the present invention is to provide a tool holding and reciprocating machine involving a small and compact base in which the means operatively connecting the clamps is confined and wherein the connecting means includes a chain and a cam engaged roller for the chain, the latter being manually actuated to tension the chain and by this means, the tension on the tools held between the upper and lower tool holders is increased or decreased.

A further object of the present invention is to provide a tool holding and reciprocating apparatus composed of a U-shaped frame whose leg portions are disposed horizontally and a vertically swingable and adjustable table, supported or mounted on the upper or lower leg portions, according to the nature and the size of the work performed.

A still further aim of the present invention is to provide a device of the aforementioned character that is simple and practical in construction, strong and reliable in use, efficient and durable in operation, inexpensive to manufacture, service and repair, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout and in which:

Figure 1 is a perspective view of the present invention assembled for use as a hack saw or jig saw;

Figure 3 is an enlarged horizontal sectional view taken substantially on the plane of section line 3—3 of Figure 2;

Figure 4 is an enlarged horizontal sectional view taken substantially on the plane of section line 4—4 of Figure 2;

Figure 6 is a detail vertical sectional view taken substantially on the plane of section line 6—6 of Figure 1;

Figure 7 is a fragmentary perspective view of Figure 1 to show the manner in which the saw blade is clampingly secured to the upper vertically slidable holder;

Figure 8 is a view similar to Figure 7 but showing a file replacing the blade;

Figure 9 is a fragmentary side elevational view of the present invention and showing the work holding table attached to the upper horizontal portion of the frame;

Figure 10 is a fragmentary perspective view of the saw blade guide used in the invention; and, Figure 11 is a fragmentary perspective view taken from the opposite side of Figure 1 and showing the holding bracket for the saw blade.

Figure 2:
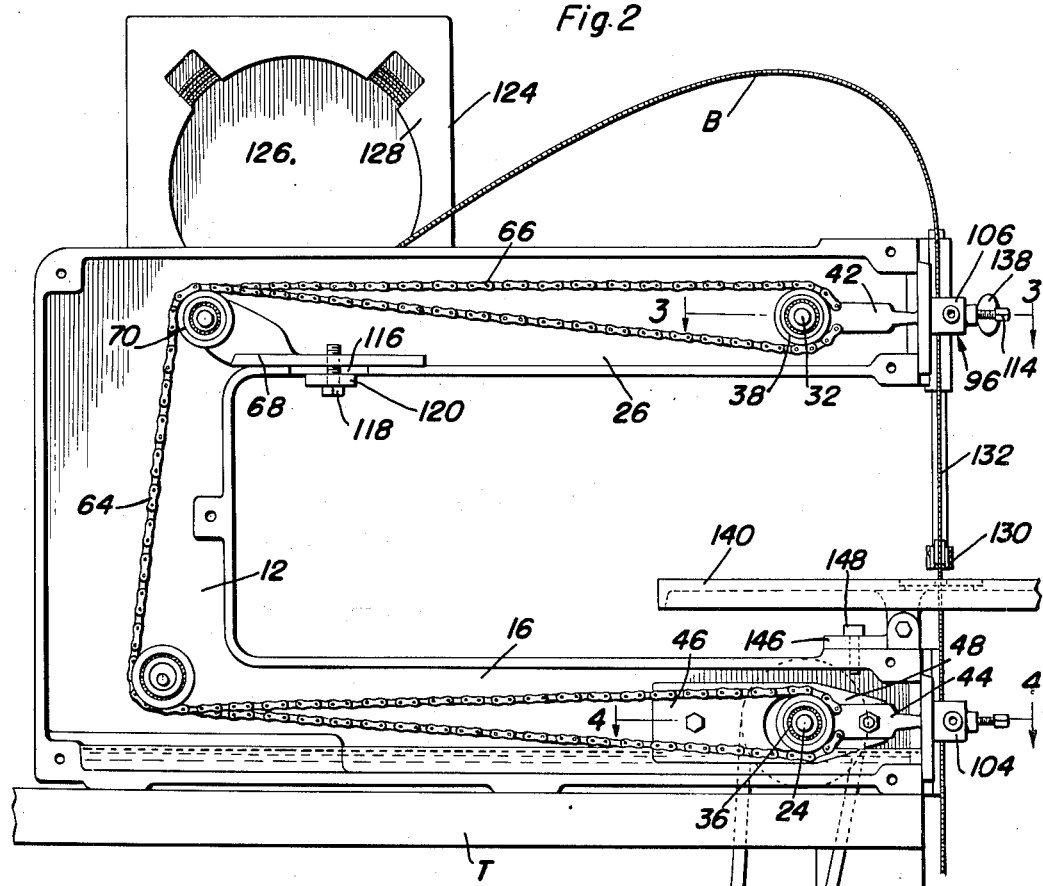
Figure 2 is a side elevational view of Figure 1, half of the U-shaped frame being removed to illustrate the mechanism in the frame.

Referring now to the drawings in detail, wherein for the purpose of illustration, there is disclosed a preferred embodiment of the present invention, the numeral 10 represents a U-shaped hollow frame or support composed of two U-shaped channel sections 12 that are removably secured together in facing relationship by fasteners 14. The flanges of the sections 12 are held in tight abutting relation by the fasteners 14, wherein a lubricant may be retained in the lower leg portion 16 of the frame for a purpose later to be described.

The lower leg portions 16 of the sections 12 are formed with reinforced bearing-forming apertures 18 that register with each other. Bearing sleeves 20 are fitted in the apertures 18 and rotatably support a lower horizontal shaft 22 having an exposed end on which a pulley 24 is secured (see Figure 4).

The upper leg portions 26 of the frame 10 are also formed with reinforced bearing-forming apertures 28. The apertures 28, as shown in Figure 3, register with each other and accommodate bearing sleeves 30 that receive an upper horizontal shaft 32. Shaft 32 parallels shaft 22 and is disposed directly above the shaft 22. The shafts 22 and 32 are disposed adjacent the ends of the frame, and more specifically the free end portions of the upper and lower horizontal leg portions 16 and 26.

Upper and lower roller bearings 34 and 36 are journaled on the shafts 22 and 32. The sleeve portions 38 and 40 of upper and lower vertically swingable members or arms 42 and 44 are engaged over the outer races of the roller bearings 34 and 36, whereby the members 42 and 44 may swing in an easy manner with very little frictional forces tending to restrict their swinging movement.

The rear apertured end 46 of a vertically swingable arm 48 receives a bearing 50 that is supported upon a horizontal fastener 52 threaded in a socket 54 on the inner face of the lower leg portion of one of the sections 12 (Figure 4). The forward end of the arm 48 is provided with an aperture that receives a bearing 56 carried by a horizontal pin element 58 removably secured to member 44. Arm 48 is provided with an opening 60 intermediate its ends that receives an eccentric or cam 62 keyed on shaft 32, whereby rotation of shaft 32 will cause eccentric 62 to ride against the edges defining opening 60 and impart oscillatory motion to arm 48 and hence oscillatory motion to member 44.

Means is provided whereby the members 42 and 44 will oscillate in unison. This means comprises a sprocket chain 64 having its upper end disposed under roller bearing 34 and pivoted to member 42, and its lower end disposed under roller bearing 36 and pivotally attached to member 44. A second sprocket chain 66 has its upper end engaged over roller bearing 34 and pivoted to member 42 and its lower end engaged over roller bearing 36 and pivoted to member 44.

A horizontal bracket 68 is removably secured within the upper leg portion of the frame 10, as shown in Figure 2, and supports bearing rollers 70 over which chains 64 and 66 are trained. The lower leg portions of sections 12 are formed with reinforced registering apertures 72 that rotatably support a horizontally disposed transverse shaft 74 having a hand knob 76 attached to one of its ends and disposed exteriorly of the frame.

A cam 78, keyed on shaft 74, extends centrally through a pair of side by side roller bearings 80 over which the chains 64 and 66 extend. The shaft 74 is manually rotated, by knob 76, to rotate the cam 78 and shift the bearings 80 for the purpose of tensioning the chains 64 and 66, and by this action the needed tension on saw blades is accomplished.

The forward ends of the lower leg portions of sections 12 are formed with vertical guides or grooves 82 that slidably receive the side edges of a lower holder 84. Vertical guide strips 86 secured to the forward ends of the lower leg portions overlap the flanged base of holder 84 and retain the same in the grooves 82, as shown in Figure 4, for vertical sliding movement. Holder 84 is provided with a recess 88 in its rear and inner face (Figure 5) that receives the forwardly extending rounded end 90 of member 44.

The forward ends of the upper leg portions of sections 12 are also provided with vertical grooves or guides 92. The guides 92 slidably receive the flanged base 94 of an upper holder or clamp 96. Vertical guide strips 98, secured to the upper leg portions of sections 12, overlap the flanged base 94 and confine the same in the guides 92 for vertical sliding movement. The inner face of base 94 is provided with a recess 100 (similar to recess 88) that receives the forwardly extended rounded end 102 of member 42, which is similar to end 90 of member 44.

Holders 84 and 96 are formed with vertical sleeves 104 and 106 that receive pressure lugs 108 and 110. The lugs 108 and 110 are supported by bolts 112 and 114 threadingly carried by the sleeves 104 and 106. Alternative threaded apertures 112' and 114' are provided in the sleeves 104 and 106 for the bolts 112 and 114 in addition to those shown receiving the bolts in Figures 3 and 4, whereby a tool may be clamped against a side face of each sleeve (Figures 7 and 8) or the rear face of each sleeve (Figures 3 and 4).

The means securing the bracket 68 in frame 10 comprises an ear 116 fixed to the upper leg portion of one of the sections 12, as shown in Figure 2, that receivably engages a bolt 118 extending upwardly through a flange 120 and into a threaded aperture in bracket 68. Flange 120 extends laterally from a channel shaped holder 122 that support a case 124 having an open face 126 and an overhanging peripheral flange 128, that confines a flexible or resilient saw blade B wound around and upon the face 126.

Blade B extends from case 124 and downwardly through the sleeves 104 and 106 and is clamped in the sleeves by lugs 108 and 110. The blade B also extends through a bifurcated member 130 at the lower end of a vertical arm or rod 132 to engage a roller 134 supported thereby. The arm 132 extends upwardly through a vertical sleeve 136 fixed to holder 96 and is held vertically adjusted by a set screw 138 carried by the sleeve 136. The blade B is considerably longer than the ditsance between holders 84 and 96 and is stored in case 124 thereby forming a reserve blade supply. The blade B is shiftable to locate different portions of said blade in position between said holders or attaching means with portions of said blades being removed after said portions have become worn from use and said reserve supply providing substitute portions for the blade portions which have been removed.

A work supporting table or platform 140 is provided with a depending ear 142 that is pivotally attached between a pair of ears 144 rising from a base plate 146. The plate 146 is formed with an aperture that receives a bolt 148 that is selectively threadingly received in an aperture in the upper and lower leg portions of one of the sections 12.

Figure 5:
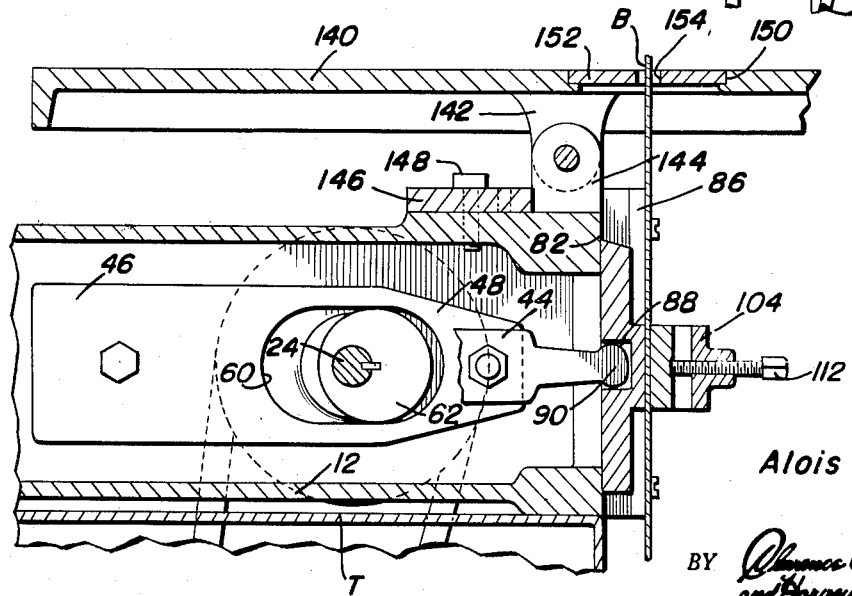
Figure 5 is a vertical sectional view taken substantially on the plane of section line 5—5 of Figure 4.

Table 140 is provided with an opening 150 in which a guide plate 152 is frictionally fitted, the guide plate having an opening 154 for slidably receiving blade B when the table 140 is supported on the lower leg portion of one of the sections 12, as shown in Figure 5.

When the device is being used for reciprocating a file F or another such tool (see Figures 8 and 9), the blade B is disengaged from the holders 84 and 96 and the file F is clamped within the upper holder 96. Also, the table 140 is moved to the upper leg portion of the frame section that supports it. Plate 152 is removed from opening 150 to permit the file to extend through opening 150, and to permit clearance for various tools, or when the table is angled.

An upwardly extending elbow 156 is removably attached to the lower lug portion of a section 12 and forms a conduit, whereby a lubricant may be admitted to the lower portion of the frame to lubricate the chains and the chain initiating reciprocating mechanism.

In practical use of the present invention, the driving shaft of a suitable motor is operatively connected to the pulley 24 to rotate shaft 22 and cam 62 and thereby effect oscillation of arm 48 and consequently oscillation of member 44. As members 42 and 44 are connected together by chains 64 and 66, as previously described, both will swing downwardly and upwardly in unison, so that the holders connected thereto will reciprocate to cause a similar motion to be transmitted to the blade B or the tool F.

The initiating actuation of the oscillatory and reciprocatory motion of the device being derived from a means connected to the lower shaft will add stability to the device and reduce vibration to a minimum although the lower leg portions of sections 12 are provided with fastener accommodating ears 158, formed on the sections 12, for mounting the frame relative to a supporting structural member, such as a table T.

Having descibed the invention, what is claimed as new is:

1. A tool reciprocating apparatus comprising a hollow substantially U-shaped frame having upper and lower portions, upper and lower spaced parallel transverse shafts rotatably supported on said upper and lower portions, a vertically swingable member journaled on each shaft, means carried by one of said shafts and engaging the member journaled on said one of said shafts for imparting swinging movement to the member journaled on said one of said shafts during rotation of the latter, a pair of chains terminally attached to said members and located completely within said frame, and guide means within the frame over which the chains extend, said guide means including a horizontal shaft paralleling said upper and lower shafts and rotatably supported on the frame, a cam secured to said horizontal shaft, a pair of antifriction rollers engaged on said cam and receiving the chains, and a knob attached to the horiozntal shaft exteriorly of the frame and manually rotated to tension the chains.

2. A tool reciprocating apparatus comprising a hollow substantially U-shaped frame having upper and lower portions, upper and lower spaced parallel shafts rotatably supported on said upper and lower portions, a vertically swingable member journaled on each shaft, means carried by one of said shafts and engaging the member journaled on said one of said shafts for imparting swinging movement to the member journaled on said one of said shafts during rotation of the latter, and means connecting said members and disposed in said frame to impart vertical swinging to the other of said members in response to vertical swinging movement of the member on said one of said shafts, said means for imparting swinging movement to the member journaled on said one of said shafts comprises a vertically swingable arm having one end pivoted in the frame and its other end pivoted to the member on said one of said shafts, said arm having an elongated opening, and an eccentric secured on said one of said shafts and disposed in the opening for oscillating the arm during rotation of the said one of said shafts.

3. A tool reciprocating apparatus comprising a U-shaped hollow frame including upper and lower horizontal portions and a vertical portion joining said horizontal portions, upper and lower horizontal shafts extending transversely through said upper and lower portions and disposed one above the other, guides on the ends of said horizontal portions adjacent the shafts, upper and lower vertically slidable holders carried by the guides, upper and lower vertically swingable members journaled on the shafts and engaged with the upper and lower holders, an arm pivotally mounted in said lower portion for vertical swinging movement and having an end pivoted to said lower member, said arm having an opening receiving said lower shaft, an eccentric secured on the lower shaft and disposed within the opening to ride against the wall of the opening and oscillate the lower member during rotation of the lower member during rotation of the lower shaft, and means within the frame and connecting said members, whereby the upper member will oscillate with the lower member.

4. A tool reciprocating apparatus comprising a U-shaped hollow frame including upper and lower horizontal portions and a vertical portion joining said horizontal portions, upper and lower horizontal shafts extending transversely through said upper and lower portions and disposed one above the other, guides on the ends of said horizontal portions adjacent the shafts, upper and lower vertically slidable holders carried by the guides, upper and lower vertically swingable members journaled on the shafts and engaged with the upper and lower holders, an arm pivotally mounted in said lower portion for vertical swinging movement and having an end pivoted to said lower member, said arm having an opening receiving said lower shaft, an eccentric secured on the lower shaft and disposed within the opening to ride against the wall of the opening and oscillate the lower member during rotation of the lower member during rotation of the lower shaft, a chain extending between the members and disposed in the frame, the ends of said frame being attached to said members, whereby oscillation of the lower member will cause oscillation of the upper member, and guide means in the frame over which said chain is trained.

5. A tool reciprocating apparatus comprising a U-shaped hollow frame including upper and lower horizontal portions and a vertical portion joining said horizontal portions, upper and lower horizontal shafts extending transversely through said upper and lower portions and disposed one above the other, guides on the ends of said horizontal portions adjacent the shafts, upper and lower vertically slidable holders carried by the guides, upper and lower vertically swingable members journaled on the shafts and engaged with the upper and lower holders, an arm pivotally mounted in said lower portion for vertical swinging movement and having an end pivoted to said lower member, said arm having an opening receiving said lower shaft, an eccentric secured on the lower shaft and disposed within the opening to ride against the wall of the opening and oscillate the lower member during rotation of the lower member during rotation of the lower shaft, a chain extending between the members and disposed in the frame, the ends of said frame being attached to said members, whereby oscillation of the lower member will cause oscillation of the upper member, upper and lower guide roller units in the frame over which the chain is trained, said lower roller unit including a horizontal supporting shaft, and a cam on said supporting shaft centrally disposed in the lower roller unit to tension the chain.

References Cited in the file of this patent

UNITED STATES PATENTS

| | | |
|---|---|---|
| 105,120 | Ogden | July 5, 1870 |
| 118,498 | Wallace | Aug. 29, 1871 |
| 191,189 | Stanley | May 22, 1877 |
| 1,467,720 | Field | Sept. 11, 1923 |
| 1,820,294 | Anderson | Aug. 25, 1931 |
| 2,074,976 | Beardsley | Mar. 23, 1937 |
| 2,272,000 | Goldhammer et al. | Feb. 3, 1942 |
| 2,509,991 | Schenke | May 30, 1950 |
| 2,609,015 | Gaviola et al. | Sept. 2, 1952 |